June 23, 1970  R. J. MUCKINHAUPT  3,516,300
CONTROL CABLE HOLDING CLAMP
Filed Oct. 5, 1967
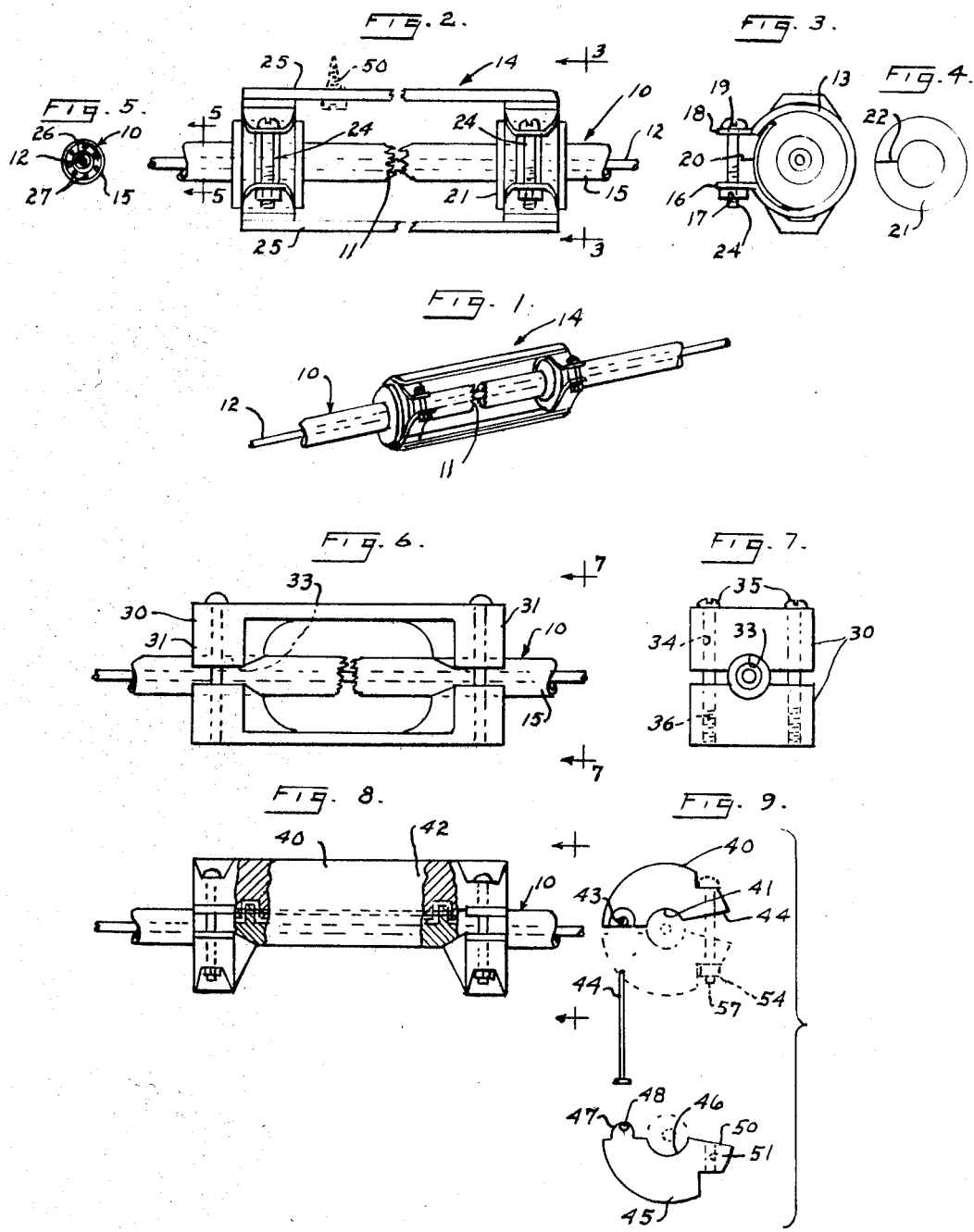
INVENTOR.
ROBERT J. MUCKINHAUPT
BY
AGENT United States Patent Office 3,516,300
Patented June 23, 1970

3,516,300
CONTROL CABLE HOLDING CLAMP
Robert J. Muckinhaupt, 35 Port Monmouth Road,
Port Monmouth, N.J. 07758
Filed Oct. 5, 1967, Ser. No. 673,215
Int. Cl. F16c 1/08; F16g 11/06
U.S. Cl. 74—501                              1 Claim

ABSTRACT OF THE DISCLOSURE

A portable clamp for a control cable in which the cable is comprised of an outer stationary covering with an internal movable wire and in which the clamp is provided as a single body portion with two end portions each being in the form of a clamp so that when a control cable breaks and the outer portion separates, the separated portions can be brought together and the clamp applied to retain the separated sections in a fixed joined relationship thus permitting the internal wire to be moveable without affecting the outer stationary covering.

---

This invention relates to clamps and more particularly to a rigidly affixed clamp for holding together two ruptured ends of a control cable as long as the central control wire is in useable condition for reciprocatory movement.

Control cables are used for various remotely operated devices and since they are flexible, many cables becomes ruptured. The cable is primarily a central movable control wire surrounded by a stationary plastic tube with a cage of stationary reinforcing wire and a fabric or plastic covering. The outer covering and the reinforcing cage of wire is generally the first to rupture due to bending and subsequent wear. Since the outer covering is held stationary particularly at one end, a rupture of the cable or complete severance of the casing ruins the function of the control cable. The break causes the whole loose cable covering to move with the movement of the inner reciprocating wire. To restore the cable to its useful function, the loose outer casing must be anchored to the section of cable that is held. The cause of wear and rupture of the control cable may vary. However when a cable extends through areas where it cannot be retained in a fairly well fixed position, the cable will tend to whip and move in the normal reciprocatory movement of the inner wire or due to vibration of the craft in which it is mounted thus it is of benefit to retain the cable or provide a means to retain the cable in a fixed and secure position. It is also to be noted that when the cable is bent too sharply about any structural member, there is excessive strain at that sharp bend. However if the cable is retained by a plurality of clamps to provide a proper form of bend, the stress on the cable is reduced and therefore the wear on the cable is also reduced.

It is an object of this invention to provide a clamp for a control wire cable that has been ruptured or had its outer stationary portion severed so that the outer portion may be gripped in its original stationary relationship.

A further object of this invention is to provide a clamp for a control wire cable having a reciprocating central wire when the outer casing of said cable has been ruptured to provide means to grip the outer casing and retain it in a stationary relationship while permitting the inner wire to move freely.

A still further object of this invention is to provide a holding clamp for a control wire cable having a reciprocating central wire to provide means to grip the outer casing and support it in a stationary relationship in a desired position while permitting the inner wire to move freely.

A still further object of this invention is to provide a holding clamp for a control wire cable having a reciprocating central wire to support it in a nonaligned position to provide a supporting bending of the cable in other configurations.

Other objects of this invention shall be apparent by reference to the accompanying detailed description and the drawings in which FIG. 1 is a perspective view of the control cable holding clamp, FIG. 2 is a side elevational view of the control cable holding clamp, FIG. 3 is an end view taken on line 3—3 of FIG. 2, FIG. 4 is a end view of a rubber grommet, FIG. 5 is a cross sectional view of the control cable taken on line 5—5 of FIG. 2, FIG. 6 is a side elevational view of a further embodiment of the control cable holding clamp, FIG. 7 is an end view taken on line 7—7 of FIG. 6, FIG. 8 is a side elevational view of a further embodiment of the control cable holding clamp, and FIG. 9 is an end exploded view taken on line 9—9 of FIG. 8.

Referring to the drawings and particularly FIG. 1 there is illustrated in perspective a control cable 10 that has been ruptured at 11 thus damaging the cable for further use due to the separation of the outer covering which, although one section may be anchored in a stationary position, the reciprocating movement of the inner wire 12 in use, due to its frictional contact with the outer covering, tends to move the severed covering with the wire thus defeating the purpose of the cable as, when the cable is attached at its remote point, the outer casing must provide a stationary holding relationship while the inner cable is movable in a reciprocating movement to provide the adjustments of a device such as the accelerator control on an outboard motor. To provide the continued use of a damaged or ruptured cable 10, this invention is primarily concerned with a holding clamp 14. The holding clamp is intended to be a stationary clamp with two ends that permit a tight grip upon the outer casing 15 of the cable 10 thus retaining the outer casing 15 in its normal position and stationary relationship even though a break has occurred in the cable between the two supporting or holding portions of the clamp 14.

The clamp as illustrated in FIG. 1 is more specifically defined in FIG. 2 in which the cable 10 shows a rupture 11 in the cable which would allow the outer casings to be separated further with the reciprocating movement of the inner wire 12. The clamp 14 may be applied to this cable by opening both ends of the clamp that is, each end is in effect a band of steel 13 similar to a hose clamp as illustrated in FIG. 3, the band of steel having a lip 16 with an aperture 17. The band continues from lip 16 in a circular form to a second lip 18 that is in parallel but spaced relation from lip 16. Lip 18 is also provided with an aperture 19. The clamp may also have a tongue 20 that is formed to extend over the open area of the clamp lips 16 and 18. With both of these clamps open, the cable may be inserted as shown in FIGS. 2 and 3. However a grommet 21 of rubber is first positioned about the cable 10. The grommet may be slit at 22 to permit easy mounting upon cable 10. With the grommet 21 in position within the band of steel 13 at each end of the clamp, the holding bolts 24 may be inserted through apertures 19 and 17 and the clamp tightened to squeeze the grommet 21 and provide a tight gripping relationship upon the outer casing 15 of cable 10. The bands of steel 13 are affixed such as by welding to a pair of rigid bars 25, bars 25 being in a parallel relationship to thus retain the two clamps in their aligned relationship and to in turn retain the outer casing 15 of the cable in an aligned relationship to permit the usual function of reciprocatory movement of wire 12. It is to be noted that cable 10, FIG. 5, is comprised of a central wire 12 with a plastic tube 26 surrounding wire 12 and a cage of reinforcing steel wires 27 surrounding the tube 26 and the outer covering 15 surrounding the wires 27. All components except wire 12 are intended to be retained in a stationary relationship. The plastic tube is provided of a plastic such as nylon that will provide the least amount of friction for the movement of the inner wire 12. With this construction due to the reinforcing steel wires 27, a great deal of compression may be applied by the clamp to hold the cable without providing pressure upon the wire 12 to provide any squeezing or friction on wire 12 in its normal movement.

Referring to FIGS. 6 and 7 there is illustrated a further embodiment of this clamp in which the clamp is provided in two identical halves 30. The configuration of the half clamp 30 is illustrated in plan view in FIG. 6 showing the holding portion 31 that is applied to the cable 10 at each end of the composite half 30. Referring to FIG. 7 the clamp, comprised of the two halves 30 is shown in an end view and at the center of each portion 30 there is provided a half round cut out portion 33 which is the bearing surface of the clamp to be applied to the outer casing 15 of cable 10. To hold the two halves 30 in this relationship, and to permit a squeezing or compression grip, there is provided a bore 34 through each section 31 of the clamp and at either side of the holding portion 33 as illustrated. The bore 34 in one half of the clamp may be a clean bore for insertion of a bolt. However the opposite half may be provided with an internal thread 36, in bore 34, so that a pair of bolts 35 may be inserted through bores 34 at each end of the clamp to be threaded to the internal threads 36 thus permitting retaining and adjusting the two halves into a gripping relationship with cable 10.

A still further embodiment of this invention is illustrated in FIGS. 8 and 9. In this embodiment the cable holding clamp comprises an elongated body portion 40 that is to be mounted parallel to the cable 10. The body portion may be half round in form with its center also formed half round to provide a gripping surface 41 to match the contour of cable 10. Body portion 40, FIG. 9, is provided with a pair of cutout portions 42 and a bore 43 from one end of the body portion to the opposite end to permit a pin 44 therethrough. A pair of lower half circular shaped elements 45 are provided to be mounted at each end of the body portion 40. Elements 45 are also formed with a half round gripping surface 46. Each element 45 is provided with a hingle shaped extension 47 with a central aperture 48. Thus, when element 45 is positioned in a mating relationship with element 40, pin 44 may be inserted through bore 43 of element 40 passing through aperture 48 of element 45 and continuing through bore 43 to pass through the second hinge shaped extension 47 and continuing through bore 43 to retain both of the elements 45 in a hinged relationship with element 40. To permit sufficient clearance between element 45 and element 40 in its clamped relationship, the open end opposite the hinge is cut or formed on an angle to provide a pair of oppositely opposed angular jaws 49 and 50. A bore 51 is provided through jaw 50 and in an aligned relationship with a bore 52 which is provided through portion 40 to permit mounting a bolt 53 through the two bores. Bolt 53 is provided with a nut 54 so that by tightening bolt 53, the element 45 is brought into a compressive relationship about a cable 10 and both ends of the clamp will then retain cable 10 in a rigid stationary relationship. It is apparent that this clamp may be mounted by releasing bolt 53 and opening elements 45 to be positioned on cable 10. Elements 45 are then moved into position as illustrated and bolts 53 are inserted as illustrated and tightened to squeeze the clamp into a gripping relationship for its holding of the cable as desired.

It is to be noted that although the clamp as illustrated in the various embodiments is primarily a repair clamp to hold two sections of a cable when a break or rupture has occurred. The clamp as illustrated in FIG. 2 may be made of any length that is, bars 25 may be of any desired length with the clamp fixed at each end as illustrated. In this additional embodiment the bars 25 are provided with apertures through which mounting screws 50 may be inserted to retain the clamp 14 at either end to provide a supporting clamp over an open area. In this embodiment, additional bands of steel 13 may be mounted either by welding or by bolting to bar 25 to provide a plurality of supports over an exceptionally long stretch of cable 10 to protect and retain cable 10 in a horizontal relationship preventing the sagging of the cable. It is also to be understood that bar 25 may be bent into other forms such as a right angle bend with the clamps as illustrated to thus support the cable 10 at the points where it may be most easily ruptured and to retain the cable in this rigid relationship rather than permitting it to whip and move when unsupported.

Although the holding clamp has been described as applied to a control cable, it may be utilized for any similar type of cable and although the clamp has been described primarily as a means of retaining two sections of a ruptured outer casing in their stationary mating relationship, it is also to be provided for retaining a cable that has not been ruptured to assist in retaining that cable in various configurations or over extended open areas without departing from the spirit of this invention and this invention shall be limited only by the appended claims.

What is claimed is:

1. A portable clamp in combination with a control cable to hold together two outer disconnected portions of said control cable, said control cable having a central movable wire and an outer open stationary casing, said clamp comprising a rigid body with two identical aligned and spaced cable retaining portions, said cable retaining portions adjustable to clamp and retain said disconnected portions of said cable casing in a stationary aligned relationship on the axis of said inner continuous and movable central wire each of said two cable retaining portions being formed as a U shaped metal band with a bolt through the two ends of the U shape to adjust and compress the band when positioned in a gripping relationship upon said cable casing and a pair of split rubber grommets that are positioned within each of said metal bands, said grommets having a central opening approximately the size of the outer casing of said control cable to fit about said control cable, and said metal bands being interconnected by a pair of bars positioned diametrically opposite to each other.

References Cited

UNITED STATES PATENTS 2,964,968  12/1960  Millington _____ 74—501

BERNARD A. GELAK, Primary Examiner

U.S. Cl. X.R.

24—125, 81, 122.3; 285—114; 339—75